Feb. 10, 1959
F. C. CAPUDER ET AL
2,873,174
REACTOR NOZZLE ASSEMBLY
Filed Nov. 21, 1956
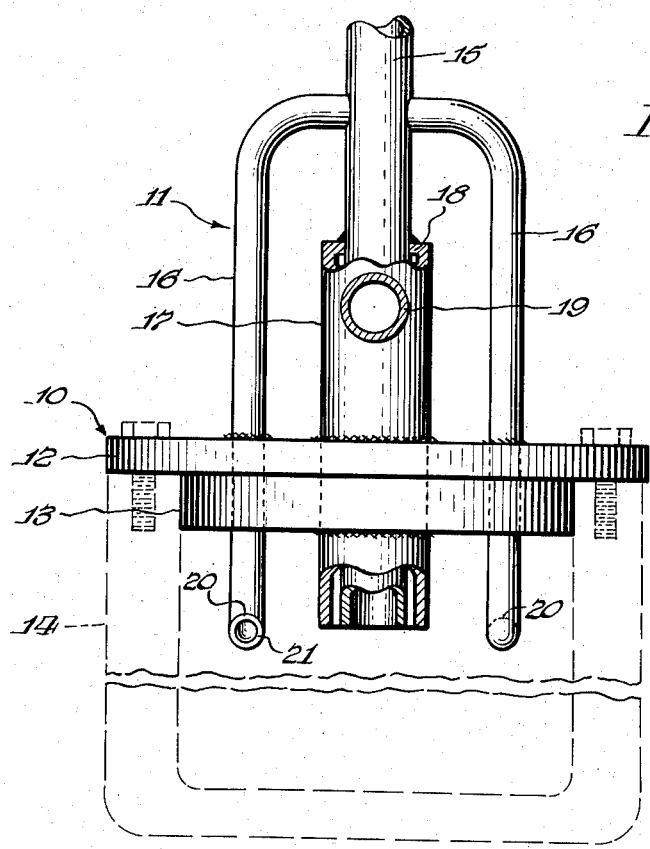
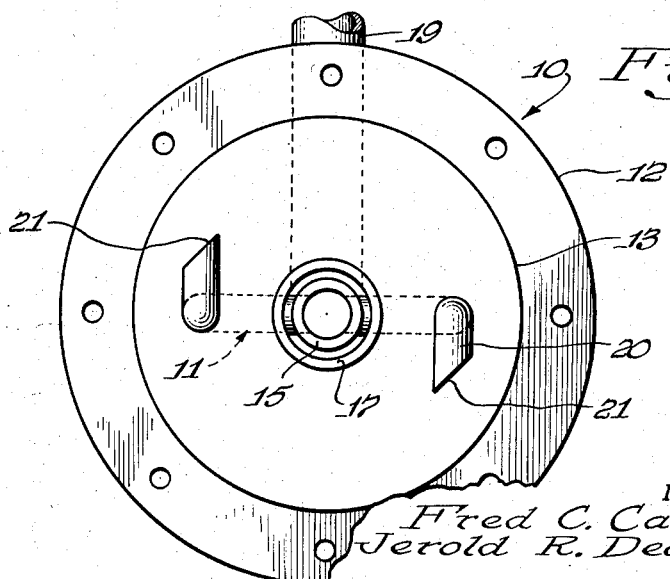
INVENTORS
Fred C. Capuder
Jerold R. Dearwater
by Roland A. Anderson
Attorney United States Patent Office 2,873,174
Patented Feb. 10, 1959

2,873,174

REACTOR NOZZLE ASSEMBLY

Fred C. Capuder, Cincinnati, Ohio, and Jerold R. Dearwater, Park Hills, Ky., assignors to the United States of America as represented by the United States Atomic Energy Commission Application November 21, 1956, Serial No. 623,714

4 Claims. (Cl. 23—284)

The present invention relates to an apparatus for bringing gases together to produce a chemical reaction between them. More specifically, the invention relates to the conversion of $UF_6$ to $UF_4$.

In the past, one method of converting uranium hexafluoride to uranium tetrafluoride has been to react the $UF_6$ with hydrogen or dissociated ammonia to produce $UF_4$. This method is carried out in a reactor vessel which is so constructed as to allow heating of the walls in order to raise the temperature of the reacting mass. This method of heating causes the major portion of the reaction to take place adjacent to the walls and causes a deposit of the reaction product or slagging on the vessel walls. In addition to the above difficulty, the design of the nozzle is such that the maximum amount of $UF_6$ which can be introduced into the reaction vessel is approximately 8 lbs. per minute and if more than this amount is fed into the reactor, the reactants are carried into the off-gas stream.

The invention hereinafter described is a nozzle of such a design that it overcomes both of the above difficulties attributable to this type reactor vessel. The nozzle is so designed as to provide for a more intimate mixing of the two reactants and at the same time furnish a layer of dissociated ammonia adjacent to the interior wall of the vessel which acts as an insulator and helps prevent the build-up of the reaction product on the vessel wall. Using this nozzle, successful runs have been made with feed rates of 12, 14, 16 and 20 lbs./min. of $UF_6$.

In the drawings:

Fig. 1 is an elevational view of the combination cover-and-nozzle construction of the present invention; and Fig. 2 is a bottom view of the construction.

The novel construction of the present application comprises a cover 10 and a nozzle 11. The cover 10 comprises integrally joined sections 12 and 13, the section 12 being of relatively large diameter and being adapted to receive screws fastening the cover to a reaction vessel 14, and the section 13 being of relatively small diameter so as to fit within the vessel 14 and seal the same.

The nozzle 11 comprises a tube 15 for dissociated $NH_3$, supplemental tubes 16 for dissociated $NH_3$, and a tube 17 for $UF_6$. The tube 17 extends through the cover 10 and is soldered or welded thereto. The tube 15 extends through the cover 10 and the tube 17, being spaced from the latter so that an annular space is provided between the tubes 15 and 17 for $UF_6$. The tube 17, or more precisely the annular space between tubes 15 and 17, is closed at the end outside the cover 10 by a flange 18, which is soldered or welded to the tube 15 and secures the tube 15 to, and thus supports it on, the tube 17. The tube 17 is supplied with $UF_6$ by a tube 19 connected thereto in a soldered or welded connection.

The supplemental tubes 16 are secured to the tube 15 at regions thereof spaced 180° from one another and beyond the end flange 18 on the tube 17. The tubes 16 extend radially outwards in opposite directions from the tube 15 and thence parallel to one another through the cover 10, to which they are secured by soldering or welding. The supplemental tubes 16 terminate in ends 20 which extend in opposite directions parallel to one another and to the cover 10 generally tangentially to a circle having its center coincident with the axis of the tube 15. The ends 20 have surfaces 21 cut obliquely so that the ends 20 open outwardly toward the walls of the reaction vessel 14. The ends 20 of the supplemental tubes 16 are spaced about as far from the cover 10 as are the adjacent ends of the tubes 15 and 17. The various parts described above may be made of novel metal.

In operation, dissociated $NH_3$ is fed into the tube 15. Because of the slight back pressure in tube 15 caused by the influx of $UF_6$ from tubes 19 and 17, a portion of the dissociated $NH_3$ passes through the supplemental tubes 16 into the vessel 14. Some of the mixing of the $UF_6$ and the dissociated $NH_3$ take place in tube 15, but a larger fraction of the mixing occurs beyond the lower ends of tubes 15 and 17. The dissociated $NH_3$ emitted from the ends 20 of tubes 16 imparts a swirling motion to the body of gases and provides an excess of hydrogen, so that there is a more intimate mixing of the reactants and a more complete reaction results. Since the surfaces 21 on the tube ends 20 are directed outwardly, the dissociated $NH_3$ emerging from the tube ends tends to furnish a blanket of gases along the interior wall of the vessel 14, which blanket helps prevent a build-up of the reaction product $UF_4$ on said wall.

The intention is to limit the invention only within the scope of the appended claims.

What is claimed is:

1. A combination cover-and-nozzle construction for a reaction vessel for converting $UF_6$ to $UF_4$, said construction comprising a plate, a first tube for dissociated $NH_3$ projecting through the plate and having two openings spaced 180° from one another and located outward of the plate, a second tube for $UF_6$ surrounding the first tube in spaced relation thereto and projecting through and secured to the plate, means outward of the plate securing one end of the second tube to a region of the first tube between the two openings therein and the plate to close said one end of second tube and to mount the first tube in the second tube, the second tube having an open end inward of the plate, and third and fourth tubes connected to the two openings in the first tube and extending outwardly from the first tube in opposite directions from each other and thence parallel to one another and terminating in open ends inside of and parallel to the plate in opposed parallel relation to one another, the said open ends of the third and fourth tubes and the ends of the first and second tubes on the same side of the plate all being about equally spaced from the plate.

2. A combination cover-and-nozzle construction for a reaction vessel for converting $UF_6$ to $UF_4$, said construction comprising a plate, a first tube for dissociated $NH_3$ projecting through the plate and having two openings outward of the plate and spaced 180° from one another and being free of communication with the second tube, a second tube for $UF_6$ surrounding the first tube in spaced relation thereto and projecting through the plate, the second tube having a closed end outward of the plate and an open end inward of the plate, and third and fourth tubes connected to the two openings in the first tube and extending radially outwardly of the first tube and thence generally in the direction of the first tube through the plate and terminating in ends spaced from the plate about the same distance as the ends of the first and second tubes on the same side of the plate.

3. The construction specified in claim 2, the said ends of the third and fourth tubes extending generally parallel to the plate and tangentially to a circle having its center on the axis of the first tube, 4. The construction specified in claim 3, the end faces of said ends of the third and fourth tubes being cut obliquely so as to cause said ends to open radially outwardly away from the first tube and toward the wall of the reaction vessel to which the plate is applied as a cover.

References Cited in the file of this patent

UNITED STATES PATENTS

| | | |
|---|---|---|
| 858,640 | Welles | July 2, 1907 |
| 986,489 | Morehead | Mar. 14, 1911 |